Dec. 24, 1940. A. CRAVARITIS 2,226,372
FRUIT CUTTING DEVICE
Filed Feb. 23, 1939
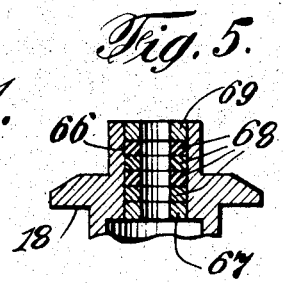
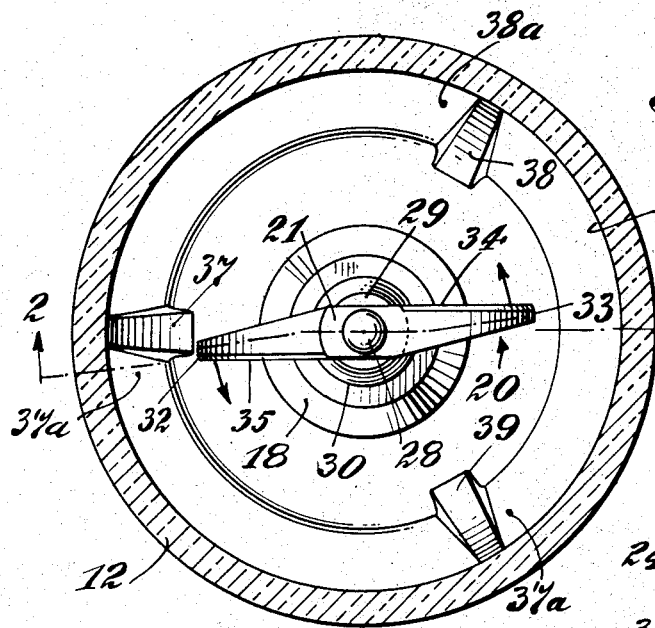
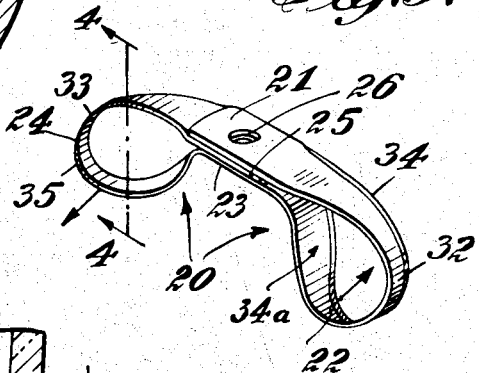
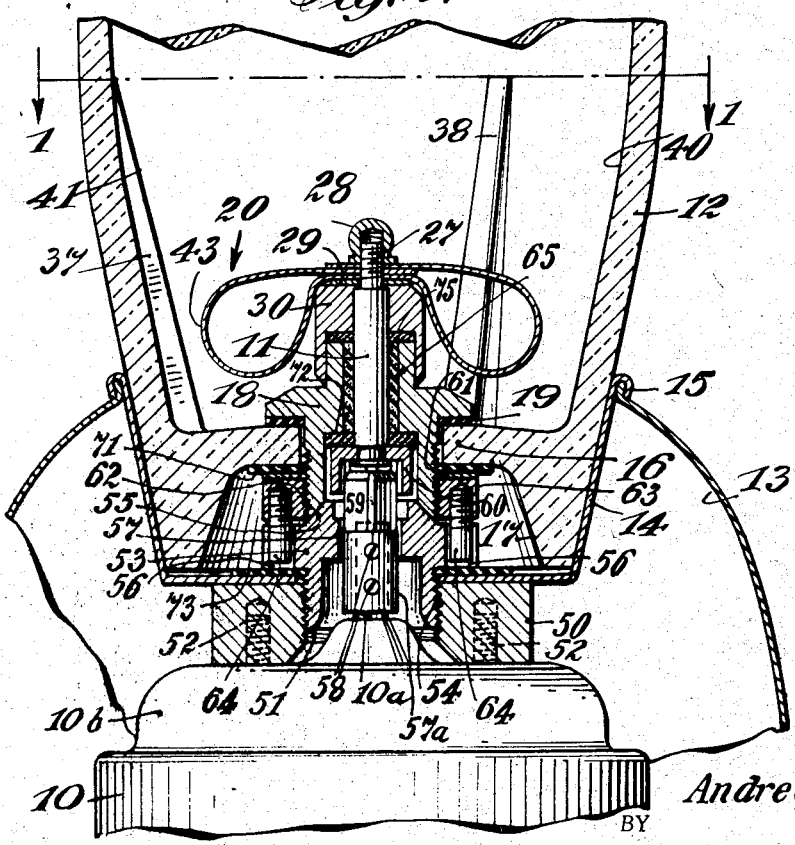
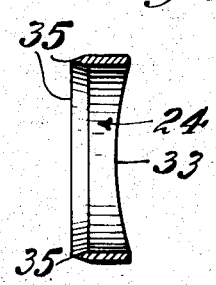
INVENTOR.
Andrew Cravaritis
BY C. P. Goepel
his ATTORNEY.

Patented Dec. 24, 1940

2,226,372

UNITED STATES PATENT OFFICE 2,226,372

FRUIT CUTTING DEVICE

Andrew Cravaritis, New York, N. Y., assignor to National Silver Deposit Ware Co., New York, N. Y., a corporation of New York Application February 23, 1939, Serial No. 257,826

7 Claims. (Cl. 146—124)

This invention relates to fruit cutting devices, and has for its object to provide an improved knife and also improved abutments for cooperating with said knife in order to finely cut the fruit such as oranges, lemons and the like in an efficient and rapid manner.

Such fruit cutters have been used heretofore, but it has been found that the knife would encounter the fruit without the fruit having any resistance other than such as results from being contained in the liquid of the fruit juices, and in consequence the fruit was not reduced to the finer particles desired to extract therefrom all the juices and flavors.

For this purpose, my invention consists of an improved knife of rotary type which will encounter as many of the fruit particles as possible and subject them to a cutting action, the improved knife being in the form of a loop with sharp cutting edges at the front part thereof, and the invention consists also in providing the container with interior ridges which form pockets for the reception of the fruit to be cut, so that when the knife approaches such pockets and the fruit objects therein contained, the knife will act upon the fruit while the fruit is being resisted in its movement by the said abutments forming such pockets.

The invention will be more fully described hereinafter, embodiments thereof shown in the drawing, and the invention will be finally pointed out in the claims.

In the accompanying drawing:

Figure 1 is a sectional plan view of the lower part of a container such as used in devices of this kind, taken on line 1—1 of Figure 2;

Figure 2 is a central vertical section of Figure 1 taken on line 2—2 of Figure 1, the upper part of the container being broken away as forming no part of the invention, as also the lower part of the motor;

Figure 3 is a perspective view of the improved knife of double looped shape sharpened at its edges in the direction of the movement of the knife;

Figure 4 is a vertical section taken on line 4—4 of Figure 3 showing the double beveled edges of the knife arranged in loop form as shown in Figure 3; and Figure 5 is a section of an improved packing and bearing.

Similar characters of reference indicate corresponding parts throughout the various views.

Referring to the drawing and more particularly to Figure 2, in devices of this kind which are known, the known motor 10 operates a rotary shaft 11 upon the upper end of which a knife is secured. The shaft 11 extends from the motor 10 upwardly and through the bottom of the casing or container 12, there being a water-tight connection in the bottom of the container in order to prevent any liquids from the interior of the container 12 passing through the bottom thereof and into the motor 10. Fruit is supplied to the interior of the container 12, such as oranges, lemons, pineapples, or the like, and the rotation of the motor due to the operation of a push button switch or the like causes the knife to rotate and the fruit is cut up into small particles, and thereby the liquid in the container may extract from the fruit its juices as also extract the flavoring volatiles from the peels or covering thereof.

Preferably, an ornamental casing 13 is provided, which extends from the lower part of the container 12 to the lower part of the motor so as to hide the motor and present, when finished in chrome or the like, a pleasing appearance. In Figure 2 this casing 13 is connected at 15 with a cup-shaped member 14 of the size and configuration of the lower part of the container 12. These parts are generally known, at least they form no specific feature of the present invention.

Also, the connection between the motor and the knife shaft 11 forms no part of this invention and may be modified as desired, it being noted that in the embodiment the container 12 has an inwardly extending bottom member 16 providing a cavity 17 in the bottom of the container 12 into which some of the connections between the shaft 11 and the motor 10 may be disposed so as to secure a water-tight connection. The shaft 11 passes through an upper bearing member 18, and disposed between this member 18 and the member 16 of the container 12 are water-proof washers 19. As this connection forms no part of the invention, it will not be described in further detail.

The improved knife consists in a strip of metal folded twice back upon itself to form loops. This is clearly seen in Figure 2, as also in the perspective view of Figure 3. The knife 20 is formed of a strip of sheet metal having its end 21 on the top of the knife. Thereupon, this end extends in loop form to form the first loop 22, and then extends into a flat or horizontal portion 23 underneath the end 21 and is then bent into a second loop 24 extending upwardly with its end 25 disposed between the upper end 21 and the lower horizontal member 23. These three superimposed layers of metal are of the same width at this portion of the knife, and they are provided with an opening 26 for the passage of the subcaliber stem 27 of the shaft 11. This subcaliber stem 27 is screw-threaded and engages a rotatable cap 28 with an interior screw-thread which by rotation locks the superimposed layers of the knife against the washer 29 resting upon the cap 30 of the bearing member 18. The cap 30 is rotatable with the shaft 11 and rests upon the upper part of the member 18. Each of the loops 22 and 24 of the knife 20 have the metal of the loops narrowed so that the narrowest portion of the metal is approximately at the points 32 and 33.

In the knife shown in Figure 3, the front part of the loop 22 is provided with a cutting edge 34 that extends the length of the metal which forms the loop, and the loop 24 is provided with its cutting edges 35 all along the metal which forms the loop 24, and in this case the cutting edge is at the rear of the knife. The cutting edge 34 being at the front of the loop 22 of the knife 20, and the cutting edge 33 being at the rear of the loop 24 of the knife 20, both cutting edges act to cut while the cutting edges present themselves to the articles to be cut in the forward direction, this being due to the fact that the knife 20 rotates in respect to the vertical axis of the opening 26.

In the container 12 at the interior thereof there are arranged three abutments, 37, 38 and 39, which extend laterally and radially inwardly of the inner wall 40 of the container 12. By thus extending substantially at right angles inwardly and preferably formed integrally with the container, the container being preferably of glass, these abutments 37, 38 and 39 form pockets 37a, 38a and 39a, into which pockets, due to the rotation of the knife which brings about the rotation of the entire mixture in a manner to form a central vortex, the heavier peels of the fruit descend toward the bottom of the container, and when they lodge, due to the rotation of the mixture, in these pockets 37a, 38a and 39a, they present themselves alongside of these abutments and the abutments resist the movements of these fruit members so that when the rapidly rotating knife arrives at any particular abutment holding such fruit members in their pockets, the knife may quickly pass through the fruit members and thereby sever the same. These abutments extend from the lowermost portion of the container 12, namely, the part 16 upwardly a certain distance about one-eighth of the height of the container, and when thus extending upwardly they taper from their widest part to their narrowest part at their top, said arrangement being indicated by the tapering line 41 in Figure 2. The inclined walls of these abutments permit the fruit members to descend when they are under the action of gravity, having then a greater force than the forces causing the vortex, and by their gradual descent along this inclined wall they have a tendency to become pocketed as before described.

The speed of these knives is considerable, and as the mixture is rotated by such knives forming a vortex as described, if the abutments were absent the velocity of the rotating fruit members would be almost equal to the velocity of the knives, and thus no resistance of the fruit members to the knives would be presented, but by the presence of the pockets and the tapering shape of the abutments together with the other inwardly extending portion, and the formation of the pockets with the wall of the container, the partially cut up members of the fruit present themselves in a position relatively stationary to the rotating knife and thereby very efficient cutting actions can take place.

In the embodiment, I have shown three such abutments, but it is clear that these can be more or less, and the inclined shape can also be varied, the essential feature being to present a stationary abutment to form a pocket into which the fruit members can aggregate so that the fruit members are resisted from partaking of a rotary movement, and being relatively stationary may be quickly and efficiently cut by the rotating knives.

It will be noted that the knife is bent at an angle to present a deflecting surface. This deflecting surface is indicated by 34a in Figure 3, and it acts very much like a turbine blade, in that when it encounters any object it thrusts that object outwardly against the wall of the container.

As it is believed that the abutments are novel in the manner shown in the drawing and heretofore described, a different form of knife than that shown in Figure 3 may be used in cooperation with such abutments, though it is preferable to use a knife such as shown in Figure 3 which has a peripheral end substantially vertical or inclined to the vertical so as to cooperate with the inclined surface of the abutment. It will be noted in Figure 2 that the inclined surface 41, if extended further inwardly, would form a tangent with the curved loop of the knife, and the curvature of the loop at this part is such as to present as large a surface of the cutting edge as is possible so that as large pieces of fruit members can be cut as may be desired. This more or less flattened end of the loop is indicated by 43.

The motor 10 is provided with its shaft 10a, and has an exterior casing 10b. Upon the casing 10b is a collar 50 which is circumferentially round at its exterior and is screw-threaded, as shown by 51 at its interior. This collar 50 is secured to the casing 10b by screws 52. Engaging the screw threads 51 is a member 53 which has screw threads 54. This member has beveled walls 55 and also has a plurality of recesses, six in number, which are radially disposed, such recesses being indicated by 56. The member 53 has a central bore 57. A sleeve is secured to the shaft 10a by set screws 58, this sleeve having at its upper end a square-shaped shank 59. This square-shaped shank 59 is engaged by an inverted cup member 60 which is provided with eight interior extending projections radially disposed and equally distant apart. This inverted cup member 60 is secured to or forms an integral part with the shaft 11. A mechanical engagement between the four corners of the shank 59 with four of the eight spaces between the projections of the cup member 60 may be readily had. The shaft 11 has surrounding it the member 19 which is provided with screw threads 61 engaging interior screw threads 62 which are part of a collar 63, to which collar are fastened two pins 64, which pins are held to the collar 63 by screw threads and which pins extend below the collar and into two of the six spaces between the projections 56. Within the member 18 and adjacent the shaft 11 is a packing and bearing device which is generally indicated by 65, and more particularly shown in Figure 5. The member 18 has an interior bore as indicated by the line 66, and within this bore 66 is first placed a lower bronze bearing 67 which has an interior bore of substantially the same diameter as the diameter of the shaft 11, being about one one-thousandth of an inch clearance. Upon this bearing 67 of bronze there are placed four superimposed leather washers 68 having interior bores of a diameter slightly less than the diameter of the shaft 11, or four one-thousandths minus the diameter of the shaft. Upon these leather washers 68 there is placed a bronze bearing member 69 substantially the same as the bronze layer 67. By pressing these two bearing layers 67 and 69 against each other, the leather washers 68 are squeezed and pressed together against each other tightly, and thereby their interior portions forming the interior bore are tightly pressed against the shaft 11. These leather washers are more or less saturated with oil so as to make them flexible and yieldable and are therefore easily worked by the pressure described so as to give a particularly tight fit to prevent any liquid from passing along the shaft 11 to the exterior thereof. It is the particular object of this packing to prevent any leakage of liquid downwardly into the motor. Washers 72 and 75 are made of fiber or catalin. Washers 70, 71 and 73 are made of rubber to prevent leakage.

It will be seen from the description of these connecting parts that the following parts rotate with the motor shaft 10a, namely, the sleeve 57 with its shank 59, the inverted cup-shaped member 60, the shaft 11, the cap 30, and the knife 20 with the fastening button 28. The packing and bearing device 65, the member 18, the member 53, the collar 50, as also the collar 63, do not rotate. Nor does the container 40 rotate.

It will be noted that as the container 40, by virtue of its inward flange member 16, has the opening formed between the flanges 16 closed by the member 18, with the member 18 and the collar 63 locking against the flange 16, the member 18 with the shaft 11, cap 30, knife 20, button 28, together with the collar 63, all form part of the container itself when these parts are assembled. The member 53 with the collar 50 form part of the motor, since they are connected therewith by the screws 52. It will therefore be seen that a very simple assembly means is provided, in that a connection is made between the shank 59 having the four corners of the square engaging with the corresponding four corners of the eight-cornered inverted cup 60, and the pins 64 engaging the recesses between the projections 56 bring about by the mere entrance of these parts, in respect to each other, a quick assembly of the parts. Hence, it is possible to assemble the motor with the member 53 which hold the cup-shaped part 14 with the container, to the bottom of which has been applied the parts 18, etc., as hereinabove described. By having two pins adapted to engage two of six recesses, and having four corners of the shank adapted to engage four of the eight recesses of the cup 60, the mere bringing of the parts together vertically brings about an assembly of parts. The connections of the pins 64 and the shank 59, as described, by mere vertical shifting of the parts relative to each other, simplifies the assembly.

The invention also is applicable for use with vegetables, meats, peanuts, nuts, etc.

I have described an embodiment of my invention, but it will be clear that changes may be made within the principle of the invention described without departing from the scope of the subjoined claims.

I claim:

1. In a cutting device having a main shaft, a stationary member having radial recesses therein, a container having a bottom with a central bore, a second member extending through said bore and attached to the bottom of the container, said second member having radially disposed pins extending therefrom adapted to engage the radial recesses of the first member, and a container shaft movable within the second member having its lower end adapted to loosely engage a main shaft exterior of the container, whereby on a longitudinal shifting of the container with its container shaft and second member into engagement with the main shaft, the pins of the second member engage within the recesses of the first member to prevent the container from rotating, longitudinal shifting in the opposite direction disengaging the container shaft from the main shaft and the pins from the recesses.

2. In a cutting device having a cylindrical container, the combination of inwardly disposed abutments extending inwardly of the inner walls of the container and inclined upwardly and outwardly from the bottom of the container and a rotatable loop shaped knife rotating around the axis of the container symmetrically with said abutments and closely adjacent the innermost portions of the abutments, said abutments forming pockets with the inner walls of the container for the reception of products to be cut to hold the same relatively to the rotating knife, a portion of the knife being bent to form a deflecting surface to project said products outwardly therefrom towards a side of the container.

3. In a cutting device, a knife consisting of a one-piece strip of metal bent into two loops with the ends of the strip overlapping and superimposed upon the central portion of the strip, with a cutting edge only at the front of one loop and a cutting edge only at the rear of the other loop, and having registering openings in the central portion and ends for the passage of a rotatable shaft.

4. In a cutting device, a knife consisting of a one-piece strip of metal bent into two loops with the ends of the strip overlapping and superimposed upon the central portion of the strip with a cutting edge only at the front of one loop and a cutting edge only at the rear of the other loop, and having registering openings in the central portion and ends for the passage of a rotatable shaft, a portion of each loop being bent to form a deflecting surface to project products outwardly therefrom.

5. In a cutting device, a knife consisting of a one-piece strip of metal bent into two loops with the ends of the strip overlapping and superimposed upon the central portion of the strip with a cutting edge only at the front of one loop and a cutting edge only at the rear of the other loop, and having registering openings in the central portion and ends for the passage of a rotatable shaft, the central portion being horizontal and the loops extending downwardly therefrom.

6. In a cutting device, a knife consisting of a one-piece strip of metal bent into two loops with the ends of the strip overlapping and superimposed upon the central portion of the strip with a cutting edge only at the front of one loop and a cutting edge only at the rear of the other loop, and having registering openings in the central portion and ends for the passage of a rotatable shaft, the central portion being horizontal and the loops extending downwardly therefrom, a portion of the knife being bent to form a deflecting surface to project said products outwardly therefrom.

7. In a cutting device, the combination of a motor, a vertically disposed shaft in said motor, a cylindrical casing for the motor out of which said shaft extends, a collar on the casing having a bore for said shaft, a container on the collar having a bore for the shaft, said shaft extending through the bore and into the container, and a looped knife on the shaft extending downwardly from the top of the shaft and into the lower part of the container between the shaft and the cylindrical walls of the container.

ANDREW CRAVARITIS.